(12) United States Patent
Trinkenschuh et al.

(10) Patent No.: US 11,780,317 B2
(45) Date of Patent: Oct. 10, 2023

(54) DRIVE UNIT DRIVE ASSEMBLY AND HYBRID MOTOR VEHICLE

(71) Applicant: Schaeffler Technologies AG & Co. KG, Herzogenaurach (DE)

(72) Inventors: Andreas Trinkenschuh, Buhl (DE); Steffen Lehmann, Ettlingen (DE); Peter Greb, Ottersweier (DE); Laszlo Man, Ottersweier (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 386 days.

(21) Appl. No.: 17/254,487

(22) PCT Filed: Jun. 4, 2019

(86) PCT No.: PCT/DE2019/100492
§ 371 (c)(1),
(2) Date: Dec. 21, 2020

(87) PCT Pub. No.: WO2019/242802
PCT Pub. Date: Dec. 26, 2019

(65) Prior Publication Data
US 2023/0122123 A1    Apr. 20, 2023

(30) Foreign Application Priority Data

Jun. 20, 2018 (DE) .......................... 102018114787.2

(51) Int. Cl.
*B60K 6/40*    (2007.10)
*B60K 6/26*    (2007.10)
(Continued)

(52) U.S. Cl.
CPC ................. *B60K 6/40* (2013.01); *B60K 6/26* (2013.01); *B60K 6/36* (2013.01); *B60K 6/387* (2013.01);
(Continued)

(58) Field of Classification Search
CPC ... B60K 6/40; B60K 6/26; B60K 6/36; B60K 6/387; B60K 6/442; B60K 6/547; F16H 63/3425; F16H 63/3458
(Continued)

(56) References Cited

U.S. PATENT DOCUMENTS 5,934,395 A * 8/1999 Koide .................. F02N 11/04
                                                    903/905
7,992,661 B2 * 8/2011 Nomura ............... F16F 15/123
                                                  180/65.245
(Continued)

FOREIGN PATENT DOCUMENTS

DE    112006001432    5/2013
DE    102015222690    5/2017
(Continued)

*Primary Examiner* — Ha Dinh Ho
(74) *Attorney, Agent, or Firm* — Volpe Koenig

(57) ABSTRACT

A drive unit (100) is provided with a first electric machine (110), a second electric machine (120), a first shaft (130) and an output shaft (140). A rotor (111) of the first electric machine (110) is rotationally fixed to the first shaft (130), and a rotor (121) of the second electric machine (120) is rotationally fixed to the output shaft (140). The drive unit (100) also includes a separating clutch (150) and a connection element (230) for the rotationally fixed connecting of an internal combustion engine, and a first gear ratio step (142) is arranged between the connection element (230) and the shafts (130, 140) with a gear ration i<1. The drive unit (100) has an electro-mechanical parking lock unit (1) with which a rotational movement of the output of the first gear ratio step (142) can be blocked.

15 Claims, 2 Drawing Sheets

(51) Int. Cl.
  *B60K 6/36* (2007.10)
  *B60K 6/547* (2007.10)
  *F16H 63/34* (2006.01)
  *B60K 6/387* (2007.10)
  *B60K 6/442* (2007.10)

(52) U.S. Cl.
  CPC .............. *B60K 6/442* (2013.01); *B60K 6/547* (2013.01); *F16H 63/3425* (2013.01); *F16H 63/3458* (2013.01); *B60Y 2200/92* (2013.01)

(58) Field of Classification Search
  USPC .......................................................... 74/661
  See application file for complete search history.

(56) References Cited

U.S. PATENT DOCUMENTS 8,091,660 B2 * 1/2012 Bordini .................. B60L 50/61
  475/5
  8,475,311 B2 * 7/2013 Ren ........................ B60K 6/442
  475/5
  10,525,968 B2   1/2020 Felsch et al.
  2006/0102409 A1 * 5/2006 Kamada .................. B60L 1/003
  180/249

FOREIGN PATENT DOCUMENTS

| | | |
  |---|---|---|
  | DE | 102015222691 | 5/2017 |
  | DE | 102015222692 | 5/2017 |
  | DE | 102015222694 | 5/2017 |
  | DE | 102017127695 | 5/2019 |
  | DE | 102017127695.5 | 5/2019 |
  | DE | 102017128289.0 | 6/2019 |
  | JP | 2013121788 | 6/2013 |
  | WO | 2015075859 | 5/2015 |
  | WO | 201084889 | 5/2017 |
  | WO | 2017084887 | 5/2017 |
  | WO | 2017084888 | 5/2017 |
  | WO | 2010095610 | 8/2020 |

* cited by examiner

DRIVE UNIT DRIVE ASSEMBLY AND HYBRID MOTOR VEHICLE

CROSS-REFERENCE TO RELATED APPLICATIONS

This application is the U.S. National Phase of PCT Appln. No. PCT/DE2019/100492, filed Jun. 4, 2019, which claims priority to DE 102018114787.2, filed Jun. 20, 2018, the entire disclosures of which are incorporated by reference herein.

TECHNICAL FIELD

A drive unit for a drive train of an electrically drivable motor vehicle, in particular a hybrid motor vehicle, and a drive assembly having a drive unit and a hybrid motor vehicle having a drive assembly.

BACKGROUND

Drive devices for a hybrid vehicle are known from the prior art, which include, inter alia, an internal combustion engine, a first electric machine and a second electric machine.

DE 10 2015 222 690 A1, DE 10 2015 222 691 A1 and WO 2017 084 887 A1 describe methods for controlling such a drive device, wherein the drive device is operable in a number of operating modes.

In DE 10 2015 222 690 A1, a serial hybrid operation is mainly explained, in which the traction drive torque is effected by means of the second electric machine and the internal combustion engine drives the first electric machine to generate electrical energy. It is described how the internal combustion engine is operated at an operating point, wherein a combined efficiency of the drive device depends on the efficiency of the internal combustion engine and on the efficiency of the first electric machine.

Documents DE 10 2015 222 691 A1 and WO 2017 084 887 A1 describe a performance-oriented and a consumption-oriented mode, wherein each mode is dependent on a condition. This condition includes that a target drive value is increased to an intermediate value, which lies between an internal combustion engine threshold representing a maximum drive value in a parallel hybrid mode, in which only the internal combustion engine produces a traction drive torque, and a parallel hybrid mode threshold representing a maximum drive value in the parallel boost hybrid mode.

DE 10 2015 222 692 A1, WO 2017 084 888 A1, DE 10 2015 222 694 A1 and WO 2017 084 889 A1 describe a method for operating a drive device of a hybrid vehicle for driving a drive wheel, wherein the drive device comprises an internal combustion engine, a first electric machine coupled with the internal combustion engine, a second electric machine, an electric accumulator and a main clutch between the internal combustion engine and the drive wheel.

DE 10 2015 222 692 A1 and WO 2017 084 888 A1 describe that the drive device is operated in one of three operating modes, namely in a purely electrical operation, a serial hybrid operation or a parallel hybrid operation, wherein the traction drive torque provided during the change from the first operating mode to the second operating mode corresponds to a suitably selectable course between the traction drive torque provided before and after the change.

DE 10 2015 222 694 A1 and WO 2017 084 889 A1 disclose that a transmission is also arranged between the internal combustion engine and the drive wheel.

Furthermore, a respective cited document describes a hybrid vehicle which has a hybrid drive device.

The hybrid vehicle described repeatedly in the prior art comprises an internal combustion engine, a first and a second electric machine, at least one drive wheel, a main clutch and a first and a second clutch. The main clutch is arranged between the internal combustion engine and a drive wheel, the first clutch is provided between the first electric machine and an output shaft of the internal combustion engine, and the second clutch is provided between the second electric machine and a drive wheel.

From the (not yet published) DE 10 2017 128 289.0, a drive unit for a drive train of a hybrid motor vehicle is known, having an internal combustion engine, a first electric machine, a second electric machine, a first gear ratio step and a driving shaft of the first electric machine and/or the second electric machine. Furthermore, the drive unit comprises a transmission sub-unit, via which the driving shaft of the respective electric machine is coupled or can be coupled to wheel drive shafts. A second gear ratio step is coupled to a countershaft unit, wherein the countershaft unit has an integrated clutch and is further connected to the wheel drive shafts such that the internal combustion engine can be coupled to the wheel drive shafts via the second gear ratio depending on the position of this clutch.

The also not yet published DE 10 2017 127 695.5 discloses a drive train for a hybrid motor vehicle, which comprises a transmission input shaft which is operatively connected to a first electric machine and an internal combustion engine via a first partial drive train for torque transmission and which is operatively connected to a second electric machine via a second partial drive train for torque transmission. The second electric machine is permanently connected to the transmission input shaft in a torque-transmitting manner and the first electric machine and the internal combustion engine can be connected to the transmission input shaft in a coupleable manner for torque transmission. The first electric machine and/or the second electric machine can thereby be designed to be cooled. It is particularly preferred if the cooling is implemented by means of water cooling from a vehicle cooling circuit or by means of oil cooling with transmission oil from the transmission. Furthermore, the separating clutch used can also be designed as an oil-cooled multi-plate clutch.

SUMMARY

Proceeding from this, the present disclosure is based on the object of providing a drive unit and a drive assembly equipped therewith and a hybrid motor vehicle equipped therewith, which ensure operation with high degree of efficiency with efficiently used installation space.

The object is achieved by the drive unit having one or more features describe herein. Advantageous embodiments of the drive unit are listed below and in the claims. In addition, a drive assembly for a motor vehicle, which has the drive unit, is provided, and a hybrid motor vehicle having the drive assembly is provided.

The features of the claims may be combined in any technically useful way, including the explanations given in the following description and features of the figures which comprise additional embodiments of the disclosure.

The disclosure relates to a drive unit for a drive train of an electrically drivable motor vehicle, in particular a hybrid motor vehicle, having a first electric machine and a second electric machine and a first shaft and an output shaft, which can also be referred to as a transmission input shaft. A rotor of the first electric machine is rotationally fixed to the first shaft and a rotor of the second electric machine is rotationally fixed to the output shaft.

Furthermore, the drive unit comprises a separating clutch, with which the rotor of the first electric machine and thus an internal combustion engine connected to the first shaft for torque transmission can be or is connected to the output shaft.

In addition, the drive unit further comprises a connection element, which is part of an output element of the internal combustion engine. This connection element is used for the rotationally fixed connection of an internal combustion engine, whereby between the connection element and the shafts, which are rotationally fixed to the rotors of the electrical machines, a first gear ratio step is arranged with a gear ratio i<1 for the purpose of translating the speed realized by the internal combustion engine to the shafts in a speed-increasing ratio. In addition, the drive unit comprises an electro-mechanical parking lock unit, which is arranged and set up in such a way that the rotary movement of the output of the first gear ratio step can be blocked therewith.

It is provided in particular that the two electric machines are arranged in series. In a preferred embodiment, it is provided that the rotors of the two electric machines or their axes of rotation are arranged coaxially.

The separating clutch is a switchable clutch that can be switched from an open state to a closed state and vice versa. In particular, it is provided that the separating clutch is closed in the normal state, so that the first shaft and the output shaft are rotationally fixed to one another.

The drive unit can be designed such that the first shaft, which is firmly connected to the rotor of the first electric machine, is arranged radially inside the output shaft, which is firmly connected to the rotor of the second electric machine.

The first shaft can be designed to be divided, namely in the form of a central hollow shaft, on which a rotationally fixed hub is arranged in some areas, which in turn is rotationally fixed to the rotor of the first electric machine.

The radial inside of the separating clutch can be rotationally fixed to the hub on the first electric machine, and the radial outside of the separating clutch can be connected to the output shaft, which is rotationally fixed to the rotor of the second electric machine.

The output of the first gear ratio step is defined correspondingly through the first shaft or the individual elements forming the first shaft or coupled in a rotationally fixed manner to the first shaft, such as the hollow shaft, hub, rotor of the first electric machine, as well as the separating clutch with the output shaft coupled to the first shaft. According to the disclosure, it is provided that, when the parking lock unit is actuated, it has a blocking effect on at least one of these elements.

Due to the fact that the output of the first gear ratio step rotates at a higher speed than the connected internal combustion engine or a connection element for the rotationally fixed connection of an internal combustion engine, the output of the first gear ratio step has a lower torque than the connection element. This enables a wear-reduced operation of the parking lock unit, since it has to apply or overcome lower forces in order to cause a rotation blockage on the first shaft.

The rotation blockage can be designed in such a way that, when there is a blockage effect, very small rotation angle amounts can still be implemented by the shafts, for example up to 2°.

The connection element preferably comprises an internally toothed gearwheel, wherein the first shaft has an external toothing and the two toothings mesh with one another for the purpose of transmitting the rotary movement from the connecting element to the first shaft. The external toothing can be a component of the first shaft, in particular its hollow shaft, or it can be formed by a further machine element which is rotationally fixed to the first shaft.

Advantageously, the output shaft further comprises a locking toothing for the positive engagement of a locking element of the electro-mechanical parking lock unit. Accordingly, it is provided that the electro-mechanical parking lock unit acts on the output shaft which, when the separating clutch is closed, thus also blocks the rotary movement of the first shaft.

The connection element can be a component of an output element of an internal combustion engine to be connected, which includes, in particular, a damper unit.

The output element can furthermore have a further clutch for opening and closing the torque transmission path between the internal combustion engine and the drive unit or else a combination of a damper unit and a clutch.

In a further advantageous embodiment of the drive unit, it is provided that the drive unit has a second gear ratio step, which is formed by a toothing, in particular an external toothing, of the output shaft and a first gearwheel meshing with the toothing of the output shaft.

This results in a ratio i>1 of the speed of the output shaft and therefore slows down, in such a way that the electro-mechanical parking lock unit engages in a complete transmission being formed from the first gear ratio step and the second gear ratio step at the point of the torque transmission path of the abutment of the maximum speed and the minimum torque.

The output shaft can itself form the toothing, or it can be connected thereto in a rotationally fixed manner.

Accordingly, a transmission is designed as a component of the drive unit, which is in operative connection with the output shaft of the drive unit, also referred to as the transmission input shaft, so that a torque made available by the output shaft or the rotary movement realized by the output shaft can be transmitted to a further transmission unit of a motor vehicle via the transmission, or can be passed directly to the drive wheels of a motor vehicle.

This transmission can include a differential transmission in the output area or be designed as such.

The first gearwheel can be coupled in a rotationally fixed manner to a countershaft of the transmission, the external toothing of which in turn meshes with an input gearwheel of a differential gear, thereby realizing a third gear ratio step.

Geometrically, the individual units of the drive unit are preferably arranged in such a way that the engagement of the electro-mechanical parking lock unit on the output of the first gear ratio step is realized in the axial direction between the position of the separating clutch and the first gear ratio step.

In a favorable embodiment, the locking toothing of the output shaft is located in the axial direction directly adjacent to the toothing for forming the second gear ratio step. On the side axially opposite the toothing for forming the second gear ratio step, the external toothing for forming the first gear ratio step is arranged on the first shaft.

The drive unit can additionally have a main controller device for controlling the electro-mechanical parking lock unit. This main controller device preferably has an interface for connection to a central controller of a motor vehicle to be equipped with the drive unit.

Another aspect of the present is a drive assembly having a drive unit according to the disclosure and having an internal combustion engine, which is coupled or can be coupled to the rotor of the first electric machine in a rotationally fixed manner via the connection element of the output element of the internal combustion engine. In a further embodiment, the drive assembly also comprises at least one wheel drive shaft, which is connected to the output shaft of the drive unit via the transmission, so that a rotational movement realized by the output shaft can be transmitted through the transmission to the wheel drive shaft.

To achieve the object, a hybrid motor vehicle is also provided, which has a drive assembly according to the disclosure and a central controller, which is connected in terms of control technology via an interface to the main controller device of the drive unit. In this way, the electro-mechanical parking lock unit can be controlled by the central controller via the main controller device of the drive unit.

BRIEF DESCRIPTION OF THE DRAWINGS

The embodiments described above are explained in detail below based on the relevant technical background with reference to the associated drawings, which show preferred embodiments. The embodiments are in no way restricted by the purely schematic drawings, wherein it should be noted that the embodiments shown in the drawings are not limited to the dimensions shown.

In the figures.

DETAILED DESCRIPTION

Figure 1:
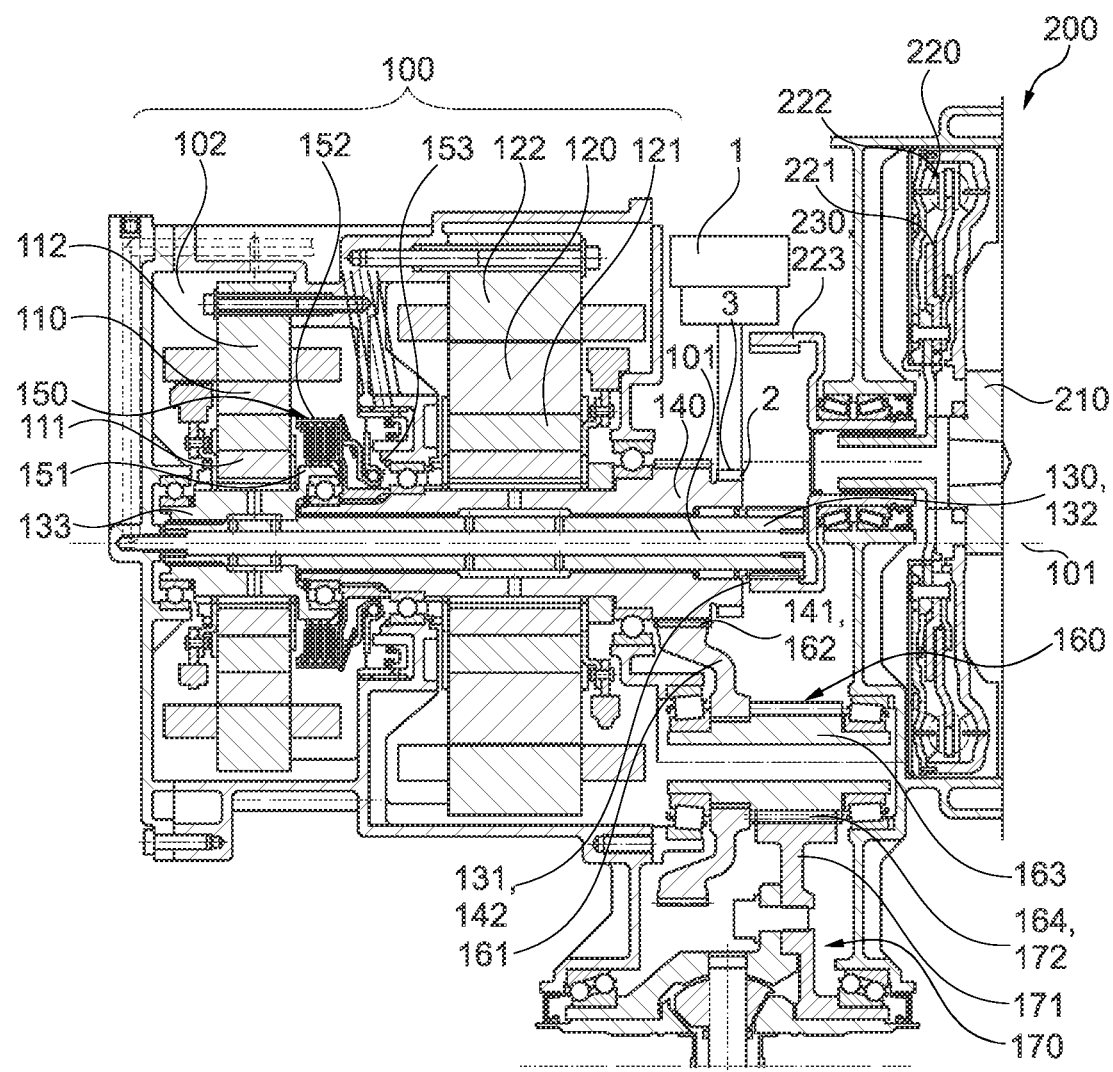
FIG. 1: shows a drive unit according to an embodiment in sectional view.

FIG. 1 shows a drive unit 100 according to an embodiment for a drive train of an electrically drivable motor vehicle, in particular a hybrid motor vehicle, which has a first electric machine 110 and a second electric machine 120, both of which are arranged on a common axis of rotation 101. The rotor 111 of the first electric machine 110 is arranged coaxially to the axis of rotation 101 and also to the rotor 121 of the second electric machine 120.

The stator 112 of the first electric machine 110 and also the stator 122 of the second electric machine 120 are accommodated in a housing 102 of the drive unit 100. The rotor 111 of the first electric machine is connected in a rotationally fixed manner to a first shaft 130. The rotor 121 of the second electric machine 120 is rotationally fixed to an output shaft 140, which can also be referred to as a transmission input shaft.

The drive unit 100 further comprises a separating clutch 150, with which the first electric machine 110 and thus an internal combustion engine connected to the first shaft 130 rotationally fixed to the rotor 111 of the first electric machine 110 can be or is connected to the output shaft 140 for torque transmission.

In the embodiment shown here, the first shaft 130 is designed in two parts, namely from a central hollow shaft 132 and a hub 133 positioned on this hollow shaft 132 and connected thereto in a rotationally fixed manner, wherein the hub 133 in turn is connected to the rotor 111 of the first electric machine 110.

The hub 133 forms the radial inner side 151 of the separating clutch 150 or is firmly connected to this input side of the separating clutch 150.

The radial outer side 152 of the separating clutch 150, which realizes the output side of the separating clutch 150, is connected to the output shaft 140 in a rotationally fixed manner.

The separating clutch 150 is a switchable clutch that can be switched from an open state to a closed state and vice versa. For this purpose, the separating clutch 150 is assigned an actuation system 153.

In this way, when the separating clutch 150 is closed, a torque can be transmitted from the first shaft 130 to the output shaft 140 or vice versa.

In the embodiment shown here, it is thus provided that the two electric machines 110, 120 are arranged in series, wherein the rotors 111, 121 of the two electric machines 110, 120 or their axes of rotation are arranged coaxially. The first shaft 130 or its central hollow shaft 132 runs radially inside the output shaft 140, whereby the overall volume required for the drive unit 100 can be made small.

Furthermore, the drive unit 100 shown here comprises a transmission 160, which is in operative connection with the output shaft 140 of the drive unit 100, also referred to as the transmission input shaft, so that a torque made available by the output shaft 140 or the rotary movement realized by the output shaft 140 can be transmitted to or reduced by a further transmission unit of a motor vehicle via the transmission 160, or can be passed directly to the drive wheels of a motor vehicle.

In the embodiment shown here, this transmission 160 comprises a differential transmission 170. Furthermore, the transmission 160 comprises a first gearwheel 161, which meshes with an external toothing 141 on the output shaft 140. A second gear ratio step 162 is thus implemented in the drive unit 100 by the first gearwheel 161. This first gearwheel 161 is thereby coupled in a rotationally fixed manner to a countershaft 163 of the transmission 160, the external toothing 164 of which in turn meshes with an input gearwheel 171 of a differential transmission 170, thereby realizing a third gear ratio step 172.

The drive unit 100 is part of a likewise illustrated embodiment of a drive assembly 200.

This drive assembly 200 additionally has an internal combustion engine (not shown here) which, when connected to the connection 210 shown, is coupled or can be coupled—with the interposition of a further clutch—in a rotationally fixed manner to the rotor 111 of the first electric machine 110 via the first shaft 130.

The shown drive assembly 200 is designed in such a way that a first gear ratio step 142 is formed between the connection 210 for an internal combustion engine (not shown here) and the first shaft 130, which is rotationally fixed to the rotor 111 of the first electric machine 110, for the purpose of translating the rotational speed of the rotary movement realized by the internal combustion engine or by its connection 210 to the first shaft 130.

For this purpose, an output element 220 of the internal combustion engine is provided, which can have a damper unit 221 or a clutch 222 for opening and closing the torque transmission path between the internal combustion engine and the drive unit 100, or a combination shown of a damper unit 221 and a clutch 222.

Furthermore, the output element 220 comprises, as a component, an internally toothed gearwheel 223 which meshes with an external toothing 131 of the first shaft 130 and thus realizes a first gear ratio step 142.

It can be seen that, in the exemplary embodiment shown here, an axis of rotation of the output element 220 is offset laterally to the axis of rotation 101 of the drive unit 100.

In this way, a rotary movement generated by the internal combustion engine, not shown here, can be directed via the output element 220 and the first gear ratio step 142 to the first shaft 130, so that the rotor 111 of the first electric machine 110 located thereon can be set in rotary movement in order to operate as a generator.

When the separating clutch 150 closes, the applied rotary movement can be transmitted from the first shaft 130, possibly amplified by an electric motor drive through the first electric machine 110, to the output shaft 140. Because of the rotationally fixed connection of the rotor 122 of the second electric machine 120 to the output shaft 140, a torque made available by the second electric machine 120 can also be applied to the output shaft 140.

Alternatively, when the separating clutch 150 is opened, only the second electric machine 120 can be operated alone in order to rotate the output shaft 140.

The rotary movement of the output shaft 140 is directed via its external toothing 141 to the first gearwheel 161 of the connected transmission 160, wherein the second gear ratio step 162 is realized.

From the first gearwheel 161, the torque or the rotational movement is transmitted to the countershaft 163, from which it is fed to the differential transmission 170 via the input gearwheel 171.

The torque is fed from the differential transmission 170 to the wheel drive shafts (not shown here) or, if required, to a further transmission for increasing or reducing the torque or the speed.

It can also be seen in FIG. 1 that the shown drive unit 200 comprises an electro-mechanical parking lock unit 1. This engages with a locking element 3 in a locking toothing 2 of the output shaft 140.

The shown drive assembly 200 can be used to implement a wide variety of driving states, such as operating the internal combustion engine alone to drive a motor vehicle, or also with the second electric machine and/or the first electric machine being connected, as well as a simultaneous generator operation of the first electric machine during operation of the internal combustion engine and/or the second electric machine, as well as a sole operation of the second electric machine, or also a recuperation operation of the first electric machine and/or the second electric machine.

The electro-mechanical parking lock unit 1 can block the rotational movement of the output shaft 140 and thus block a wheel drive of a vehicle equipped with the drive unit.

The connection element 230 of the output element 220, which is used to connect an internal combustion engine (not shown here), is obviously designed with a larger diameter than the external toothing 131 of the first shaft 130, so that the first gear ratio step 142 implemented as a result increases the speed of the output element 220. In a corresponding manner, the torque applied to the first shaft 130 is relatively low, so that the electro-mechanical parking lock unit 1 engaging here has to overcome or maintain relatively low torques.

Figure 2:
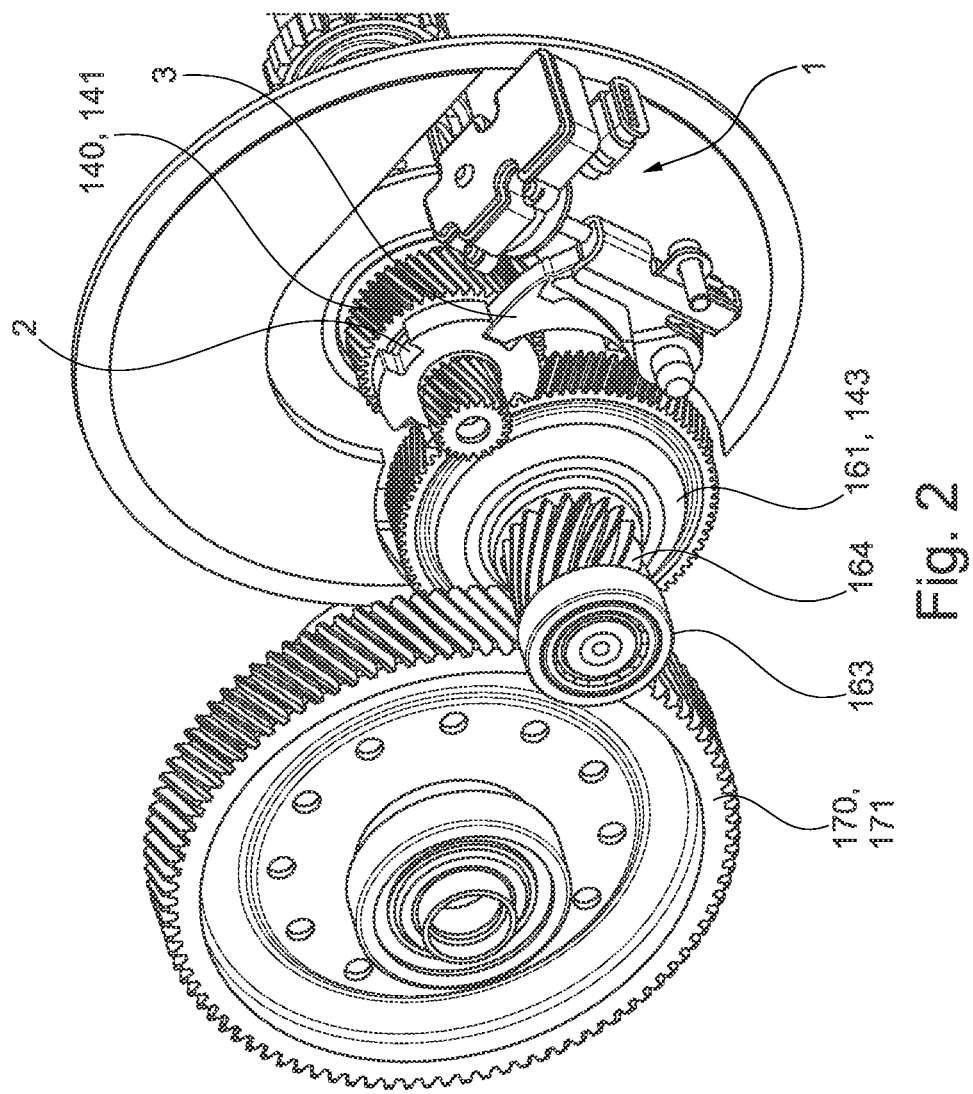
FIG. 2: shows an electro-mechanical parking lock unit in a perspective view.

In FIG. 2, an electro-mechanical parking lock unit 1 is shown in perspective. In detail, a locking element 3 is shown here as an element of the electro-mechanical parking lock unit 1, which can be actuated in such a way that, as can be seen in FIG. 2, it can engage in a locking toothing 2 on or in the output shaft 140. Rotation of the output shaft 140 is thus blocked. In a corresponding manner, a rotary movement of the output 143 of the first gear ratio step 142 is blocked.

As a result, a rotational movement of the first gearwheel 161, which is located on a countershaft 163, is blocked. The rotary movement of the external toothing 164, which is arranged in a rotationally fixed manner in this regard, is also blocked.

As a result of the engagement of the input gearwheel 171 of the differential transmission 170 in the external toothing 164 of the countershaft 163, the differential transmission 170 is correspondingly blocked.

In this way, the electro-mechanical parking lock unit 1 can block a rotational movement of the wheels of a motor vehicle connected to the differential transmission 170 and a parking lock can be realized.

With the drive unit proposed here and the drive assembly equipped therewith and the hybrid motor vehicle equipped therewith, devices are made available, which ensure operation with a high degree of efficiency with efficiently used installation space.

List of Reference Symbols
1 Electro-mechanical parking lock unit
2 Locking toothing (of the output shaft)
3 Locking element (of the parking lock unit)
100 Drive unit
101 Axis of rotation
102 Housing
110 First electric machine
111 Rotor of the first electric machine
112 Stator of the first electric machine
120 Second electric machine
121 Rotor of the second electric machine
122 Stator of the second electric machine
130 First shaft
131 External toothing of the first shaft
132 Central hollow shaft
133 Hub
140 Output shaft
141 External toothing of the output shaft
142 First gear ratio step
143 Output of the first gear ratio step
150 Separating clutch
151 Radial inside of the separating clutch
152 Radial outside of the separating clutch
153 Actuation system
160 Transmission
161 First gearwheel
162 Second gear ratio step
163 Countershaft
164 External toothing of the countershaft
170 Differential transmission
171 Input gearwheel
172 Third gear ratio step
200 Drive assembly
210 Connection for an internal combustion engine
220 Output element
221 Damper unit
222 Clutch
223 Internally toothed gearwheel
230 Connection element

The invention claimed is:

1. A drive unit for a drive train of an electrically drivable motor vehicle, the drive unit comprising:
   a first electric machine including a rotor;
   a second electric machine including a rotor;
   a first shaft to which the rotor of the first electric machine is rotationally fixed;
   an output shaft to which the rotor of the second electric machine is rotationally fixed;

a separating clutch, with which the rotor of the first electric machine is connectable to the output shaft for torque transmission;

a connection element configured for rotationally fixed connecting of an internal combustion engine;

a first gear ratio step is arranged with a gear ratio i<1 between the connection element and the shafts, which are rotationally fixed to the rotors of the electric machines; and an electro-mechanical parking lock unit configured such that a rotary movement of an output of the first gear ratio step is blockable therewith, wherein the output shaft has a locking toothing for positive engagement of a locking element of the electro-mechanical parking lock unit.

2. The drive unit according to claim 1, wherein the connection element comprises an internally toothed gearwheel, and the first shaft has an external toothing, wherein the internally toothed gearwheel and the external toothing mesh together for transmitting the rotary movement from the connection element to the first shaft.

3. The drive unit according to claim 1, wherein the connection element is adapted to be part of an output element of the internal combustion engine to be connected, and comprises a damper unit.

4. The drive unit according to claim 1, further comprising a second gear ratio step formed by a toothing of the output shaft and a first gearwheel meshing with the toothing of the output shaft, and a gear ratio i>1 of a speed of the output shaft is realized such that the electro-mechanical parking lock unit engages in a complete transmission formed from the first gear ratio step and the second gear ratio step at a point of a torque transmission path of a coinciding of a maximum speed and a minimum torque.

5. The drive unit according to claim 4, wherein the engagement of the electro-mechanical parking lock unit on the output of the first gear ratio step is realized in an axial direction between a position of the separating clutch and the first gear ratio step.

6. The drive unit according to claim 5, wherein the locking toothing of the output shaft is located in an axial direction immediately adjacent to the toothing for forming the second gear ratio step.

7. The drive unit according to claim 1, further comprising a main controller for controlling the electro-mechanical parking lock unit.

8. A drive assembly comprising:
a drive unit according to claim 7; and
the internal combustion engine, which is couplable in a rotationally fixed manner to the rotor of the first electric machine via the connection element of an output element of the internal combustion engine.

9. A hybrid motor vehicle, comprising:
a drive assembly according to claim 8 and a central controller, which is connected via an interface to the main controller of the drive unit.

10. A drive unit for a drive train of an electrically drivable motor vehicle, the drive unit comprising:
a first electric machine including a rotor;
a second electric machine including a rotor;
a first shaft to which the rotor of the first electric machine is rotationally fixed;
an output shaft to which the rotor of the second electric machine is rotationally fixed;
a separating clutch, with which the rotor of the first electric machine is connectable to the output shaft for torque transmission;
a first gear ratio step with a gear ratio i<1 arranged upstream in a torque transmission path from the first shaft and the output shaft; and
an electro-mechanical parking lock unit configured such that a rotary movement of an output of the first gear ratio step is blockable therewith, wherein an engagement of the electro-mechanical parking lock unit on the output of the first gear ratio step is realized in an axial direction between a position of the separating clutch and the first gear ratio step.

11. The drive unit according to claim 10, wherein the first gear ratio step is configured to be connected to an internal combustion engine.

12. The drive unit according to claim 10, further comprising a connection element configured for rotationally fixed connecting of an internal combustion engine, the first gear ratio step is arranged between the connection element and the first shaft and the output shaft in the torque transmission path, the connection element comprises an internally toothed gearwheel and the first shaft has an external toothing that meshes therewith for transmitting the rotary movement from the connection element to the first shaft.

13. The drive unit according to claim 12, wherein the connection element comprises a damper.

14. The drive unit according to claim 10, further comprising a second gear ratio step formed by a toothing of the output shaft and a first gearwheel meshing with the toothing of the output shaft, and a gear ratio i>1 of a speed of the output shaft is realized such that the electro-mechanical parking lock unit engages in a complete transmission formed from the first gear ratio step and the second gear ratio step at a point of a torque transmission path of a coinciding of a maximum speed and a minimum torque.

15. The drive unit according to claim 14, wherein a locking toothing of the output shaft is located in an axial direction immediately adjacent to the toothing for forming the second gear ratio step.

* * * * *